United States Patent [19]

Bonsack et al.

[11] Patent Number: 4,540,551
[45] Date of Patent: Sep. 10, 1985

[54] TWO STAGE CHLORINATION OF TITANIFEROUS ORE WITH FECL3 RECLAMATION

[75] Inventors: James P. Bonsack, Aberdeen; Semyon D. Fridman, Randallstown, both of Md.

[73] Assignee: SCM Corporation, New York, N.Y.

[21] Appl. No.: 707,196

[22] Filed: Mar. 1, 1985

Related U.S. Application Data

[63] Continuation-in-part of Ser. No. 638,977, Aug. 8, 1984.

[51] Int. Cl.$^3$ ............................................. C01G 23/02
[52] U.S. Cl. ........................................ 423/77; 423/74; 423/79; 423/76
[58] Field of Search ..................... 423/74–76, 423/78, 79, 77; 75/1 T

[56] References Cited

U.S. PATENT DOCUMENTS

| | | | |
|---|---|---|---|
| 2,589,466 | 3/1952 | Wilcox | 423/78 |
| 2,642,339 | 6/1953 | Sawyer | 423/502 |
| 2,657,976 | 11/1953 | Rowe et al. | 423/74 |
| 3,067,005 | 12/1962 | Nelson et al. | 423/74 |
| 3,105,736 | 10/1963 | Groves | 423/60 |
| 3,144,303 | 8/1964 | Engelmann | 423/74 |
| 3,376,112 | 4/1968 | Dunn, Jr. et al. | 423/502 |
| 3,466,169 | 9/1969 | Newak et al. | 75/112 |
| 3,495,936 | 2/1970 | Jones, Jr. | 423/79 |
| 3,683,590 | 8/1972 | Dunn, Jr. | 55/71 |
| 3,787,556 | 1/1974 | Piccolo et al. | 423/77 |
| 3,859,077 | 1/1975 | Othmer | 75 1 R/ |
| 3,865,920 | 2/1975 | Dunn, Jr. | 423/74 |
| 3,897,537 | 7/1975 | Robinson et al. | 423/86 |
| 3,925,057 | 12/1975 | Fukushima et al. | 75/1 T |
| 3,926,614 | 12/1975 | Glaeser | 75/1 R |
| 3,977,862 | 8/1976 | Glaeser | 75/1 T |
| 3,977,863 | 8/1976 | Glaeser | 75/1 T |
| 3,977,864 | 8/1976 | Glaeser | 75/1 T |
| 3,989,510 | 11/1976 | Othmer | 75/1 T |
| 4,014,976 | 3/1977 | Adachi et al. | 423/79 |
| 4,017,304 | 4/1977 | Glaeser | 177/142 |
| 4,046,853 | 9/1977 | Robinson | 423/77 |
| 4,055,621 | 10/1977 | Okudaira et al. | 423/79 |
| 4,140,746 | 2/1979 | Turner et al. | 423/79 |
| 4,174,381 | 11/1979 | Reeves et al. | 423/502 |
| 4,183,899 | 1/1980 | Bonsack | 423/79 |
| 4,279,871 | 7/1981 | Bonsack | 423/74 |
| 4,310,495 | 1/1982 | Bonsack | 423/76 |
| 4,329,322 | 5/1982 | Bonsack et al. | 423/74 |
| 4,343,775 | 8/1982 | Bonsack | 423/78 |
| 4,442,076 | 4/1984 | Bonsack | 423/78 |

*Primary Examiner*—H. T. Carter
*Attorney, Agent, or Firm*—R. A. Sturges; T. M. Schmitz

[57] ABSTRACT

There is provided a multi stage process for nonselectively chlorinating a titaniferous ore containing iron to produce $TiCl_4$. In this process a portion of the ore charge is subjected to conventional fluid bed chlorination to produce $TiCl_4$ and $FeCl_2$. A second portion is subdivided and submitted to chlorination in a dilute phase chlorination step using $FeCl_3$ as the chlorinating agent to produce additional $TiCl_4$. The $FeCl_3$ is obtained by partial oxidation of the $FeCl_2$ obtained in the first stage and/or second stage to yield $Fe_2O_3$ and $FeCl_3$. The product streams of $TiCl_4$ are then combined for further treatment.

13 Claims, 4 Drawing Figures

TWO STAGE CHLORINATION OF TITANIFEROUS ORE WITH FECL3 RECLAMATION

RELATED APPLICATION

This application is a continuation in part of our co-pending application Ser. No.: 638,977 filed Aug. 8, 1984. This application is also related to commonly owned application Ser. No.: 638,908 filed Aug. 8, 1984.

This invention relates to chlorination of iron-bearing titaniferous materials, e.g., ilmenite or titania slag, in a multistage process. It provides for nonselective chlorination of a portion of the ore charge with chlorine in a primary chlorinator to produce titanium tetrachloride ($TiCl_4$) and $FeCl_2$ or $FeCl_3$ or a mixture of $FeCl_2$ and $FeCl_3$, and nonselective chlorination of the remaining ore with $FeCl_3$ in a secondary chlorinator to produce $TiCl_4$ and $FeCl_2$. The $FeCl_2$ from the secondary chlorinator and primary chlorinator (if any $FeCl_2$ is produced) is converted to $FeCl_3$, which is used as the chlorinating agent in the secondary chlorinator, and $Fe_2O_3$.

BACKGROUND OF THE INVENTION AND PRIOR ART

Conversion of the titanium values in various titaniferous ores has been accomplished heretofore mainly by chlorination of an ore/carbon mixture under fluidized bed conditions. Usually, the chlorination agent has been elemental chlorine. By-product iron chlorides from titaniferous ores containing iron pose a problem in disposal and waste valuable chlorine. Previously chlorine values in by-product iron chlorides have been recovered by full oxidation thereof with air or oxygen to $Fe_2O_3$ and $Cl_2$.

In the present process, advantages are obtained by partial oxidation of the ferrous chloride as distinct from the complete oxidation of $FeCl_2$-$FeCl_3$ contemplated in prior effects. Instead of a single stage chlorination, as most often practiced heretofore, the present invention contemplates a two stage process. In the first stage, a major part of the ore to be processed, e.g., 60% to 90% by weight is chlorinated in a conventional fluidized bed reactor yielding $TiCl_4$ and $FeCl_3$ or $FeCl_2$ or a mixture of $FeCl_2$ and $FeCl_3$. A second smaller portion of the ore, e.g., 10% to 40% by weight is ground ($-325$ mesh) and chlorinated in a dilute phase reactor with $FeCl_3$ vapor. The chlorine values in the iron chloride are recovered by partial oxidation of the $FeCl_2$ to $FeCl_3$ and $Fe_2O_3$.

There is a large amount of prior art directed to the oxidation of $FeCl_2$ or $FeCl_3$ to $Cl_2$ that attempts to solve problems inherent in this reaction.

The patent literature on dilute phase or entrained flow chlorination is not as extensive. Reference may be had to U.S. Pat. Nos. 4,183,899 and 4,343,775 commonly owned with the present application.

The main problem with the full oxidation of $FeCl_2$ or $FeCl_3$ to $Cl_2$ is that at low temperatures where the thermodynamics are favorable, the reaction is slow. At higher temperatures where the reaction proceeds at a practical rate, the thermodynamics are unfavorable and the reaction is far from complete.

To overcome this problem, Dunn U.S. Pat. Nos. 3,887,694 and 3,376,112 and Bonsack U.S. Pat. Nos. 3,944,647 and 3,919,400 taught the use of catalysts to speed up the reaction at lower temperatures where the thermodynamics are more favorable. Dunn U.S. Pat. No. 3,865,920 and Bonsack U.S. Pat. No. 3,094,854 also suggest systems operating at higher temperatures where unreacted $FeCl_3$ is separated and recycled back to the oxidation zone. Dunn U.S. Pat. No. 3,865,920 also suggests the use of a very long "flue pipe" on the oxidation zone discharge that is held at a lower temperature.

Another severe problem with $FeCl_2$ or $FeCl_3$ oxidation to $Cl_2$ is the formation of hard, dense $Fe_2O_3$ deposits on the inner walls especially near the oxidation zone discharge. Attempts to solve this problem were the subjects of U.S. Patents to Sawyer U.S. Pat. No. 2,642,339; Nelson, U.S. Pat. No. 3,050,365 and U.S. Pat. No. 3,092,456; Reeves, U.S. Pat. No. 3,793,444; and Mitsubishi U.S. Pat. No. 4,073,874.

The following is a more detailed review of prior art in this field:

U.S. Pat. No. 2,589,466 to Wilcox discloses a process for removing titanium and titanium tetrachloride from ilmenite ore by heating the ore to a temperature above 1250° C. but below 1500° C., similarly heating chlorine to such a temperature and then bringing the chlorine and ore together in a reaction chamber. The iron contaminant in the ilmenite ore is removed as a solid residue while the $TiCl_4$ is vaporized out of the reactor.

U.S. Pat. No. 2,642,339 to Sawyer teaches a process for oxidizing iron halides to produce iron oxide and chlorine comprising reacting ferric chloride with dry air in the vapor phase at a temperature of from 600° to 800° C. in a vertical reaction zone containing a bed of finely divided catalytic iron oxide under conditions that prevent substantial build up of reaction product on the inner surfaces of the reactor.

U.S. Pat. No. 2,657,976 to Rowe et al. show a process for producing iron oxide and titanium tetrachloride from titaniferous iron ores. According to this process, the titanium ore containing iron is subdivided, mixed with carbon and placed in a chamber. Chlorine and moist air are introduced into the chamber to produce at an elevated temperature volatile ferric chloride substantially free from titanium tetrachloride. The amount of chlorine added is the theoretical amount required to react with the iron values but not with the titanium values. Moist air is also added. Ferric chloride is volatilized and separated from the titanium concentrate, and the ferric chloride reacted immediately with oxygen to produce ferric oxide and chlorine gas. The ferric oxide and chlorine so produced are separated and the chlorine returned to react with the titanium values in the concentrate to produce titanium tetrachloride. The reactions take place in a divided reactor.

U.S. Pat. No. 3,067,005 to Nelson et al., discloses a process for chlorinating a ferrotitanate such as ilmenite in a fluid bed reactor. Unreacted chlorine in the gaseous stream rising from the reaction zone is fixed (i.e., converted to a normally solid form) by adding $FeCl_2$ in particulate form to the stream while the stream is still at a temperature where $FeCl_2$ reacts with $Cl_2$ at a convenient speed, i.e., at a temperature in excess of 700° C. The resulting $FeCl_3$ at once sublimes and joins the off-gas stream from, which it can be readily separated. This process is adaptable for use in the present primary chlorination stage.

U.S. Pat. No. 3,105,735 to Groves discloses a process for the chlorination of metal bearing materials in a bed in a zone of chlorination which is improved by establishing a pair of fluidized beds of pulverulent material to be chlorinated suspended in an upwardly flowing stream of gas which is inert to the material. The beds having upper levels and being in communication below the upper levels. The upper level of the first bed forms a surface bounded on the one side by the fluid bed and on the other side by an inert fluidizing gas. The upper level of the second bed communicates directly with the zone of chlorination. As more material is fed into the first bed, material flows into the second of the beds and from there into the zone of chlorination by flow of the upper level.

U.S. Pat. No. 3,144,303 to Engelmann discloses a continuous process for the production of volatile metal halides, especially titanium tetrachloride and ferric chloride within a closed reaction vessel at an elevated temperature in the presence of a gaseous or finely divided solid reducing agent, chlorine and a fluidized bed suspension of a finely divided titaniferous material such as ilmenite or rutile. The temperature and composition of the bed is maintained with optimum operating conditions by means of a dynamic interchange between a portion of the particles of the reactant bed with the particles from a communicating separate auxiliary fluidized bed maintained under control or regulated nonreacting conditions.

U.S. Pat. No. 3,376,112 to Dunn et al. relates to a process for flowing a molten metal salt complex of the formula $XFeCl_4$ where X is an alkali metal as a thin film over a moving bed of particulate inert material cocurrently with an oxygen containing gas and recovering chlorine as a product.

U.S. Pat. No. 3,466,169 to Nowak et al. provides a process for chlorinating an ore in the presence of coke. The amount of chlorine is limited to the stoichiometric amount needed to form the chloride of the metal of greatest chloride forming affinity. The temperature is held above the vaporization point of the resulting chloride. This removes all of the metal of greatest chloride forming affinity from the ore. The resulting chloride gas along with any chloride impurities formed is passed over new ore which is free of carbon at which time chloride impurities are removed in favor of additional chloride of the metal of greatest chloride forming affinity in order to yield pure chloride of the metal of greatest chloride forming affinity. This pure metal chloride may then be reduced to yield metal in the zero valence state and the ore that is then free of all metals of greatest chloride forming affinity can be treated similarly for collection of the chloride of the metal of next greatest chloride forming affinity. $TiCl_4$ is contemplated according to this process.

U.S. Pat. No. 3,495,936 to Jones discloses a dilute phase chlorination process for titaniferous ores. Here the ores reacted with chlorine and a carbonaceous reducing agent in a dilute phase reactor system to yield metal chloride products, chiefly titanium tetrachloride.

U.S. Pat. No. 3,683,590 to Dunn teaches a process for condensing iron chlorides from a gaseous stream in two steps, the first step being the cooling of the gases to about 675° C. to condense ferrous chloride as a liquid and leaving a gaseous ferrous residual and then in a second step of adding chlorine gas and sodium chloride salt separately wherein the remaining $FeCl_2$ is oxidized to $FeCl_3$ which with the initial $FeCl_3$ is converted to $NaFeCl_4$ and cooling that product to a temperature above 159° C. This process is useful for recovering iron chlorides from gaseous effluent to minimize air pollution.

According to U.S. Pat. No. 3,787,556 to Piccolo et al. titanium tetrachloride is made by feeding powdered ilmenite or titanium slag to a reactor with a reagent and heating gas streams of chlorine and the combustion products of coal. The reagent is carbon.

U.S. Pat. No. 3,859,077 to Othmer teaches the production of pure titanium dioxide under reducing conditions by a halogenoxygen interchange between a titanium tetrahalide and an oxide of iron contained in a slag or in an ore such as ilmenite, at a temperature of 1000° C. The iron and various impurities are volatilized as halides. Solid $TiO_2$ remains with some impurities which may be washed out with water or an aqueous acid or alkali. The gaseous ferrous halide is then reacted with some or all of the titanium dioxide and a reductant at a temperature above 1550° C. to be reduced to molten metallic iron and to give the gaseous titanium halide which is passed to a first reactor. Only makeup halogen is required.

U.S. Pat. No. 3,865,920 to Dunn teaches that chlorine and iron chlorides and mixtures thereof, produced in the chloride process for beneficiating titaniferous ores, by injecting oxygen in the gas space above the fluidized bed.

U.S. Pat. No. 3,897,537 to Robinson et al. teaches the beneficiation of ilmenite ores by oxidation to yield a pseudobrookite-containing material, reduction of the oxidation product to convert at least 4% of its iron content to the ferric state, and leaching out the reduced material. The beneficiate is suitable for chlorination under fluidized-bed reaction conditions to yield $TiCl_4$.

U.S. Pat. No. 3,925,057 to Fukushima et al. teaches a process for recycling chlorine gas in the selective chlorination treatment of iron oxide ores containing titanium for the purpose of obtaining ores enriched with $TiO_2$. Here the chlorine gas introduced into the chlorination reaction is converted to ferric chloride by reaction with the iron oxide. The ferric chloride is reconverted to free chlorine by reaction with oxygen in an oxidation process, and the isolated chlorine returned to the chlorination step.

U.S. Pat. No. 3,926,614 to Glaeser teaches a process for the selective chlorination of the iron constituent of titaniferous ores using $FeCl_3$ as the chlorinating agent and using a solid carbonaceous reductant. The $FeCl_3$ can be produced by oxidizing the $FeCl_2$ resulting from the selective chlorination thereby providing for a recycled operation.

U.S. Pat. No. 3,977,862 to Glaeser teaches the selective chlorination utilizing ferrous chloride alone or in combinations with other chlorinating members notably chlorine, hydrogen chloride or ferric chloride as part or all of the chlorinating agent. An elevated temperature of 950° to 1400° C. is maintained during the chlorination.

U.S. Pat. No. 3,977,863 to Glaeser discloses essentially the same process as in the U.S. Pat. No. 3,977,862.

U.S. Pat. No. 3,977,864 to Glaeser discloses essentially the same reduction/chlorination process for the treatment of titaniferous materials such as ilmenite.

U.S. Pat. No. 3,989,510 to Othmer describes a process including a reactor operating at a high temperature up to 1950° C. which is charged with a mixture of an iron bearing titaniferous ore, silica, a chloride of an alkali or alkaline earth metal and a solid reductant such as coke. $TiCl_4$ is produced.

U.S. Pat. No. 4,014,976 to Adachi et al. teaches the production of $TiCl_4$ by recting a $TiO_2$ material having a particle size of 150 mesh with chlorine in the presence of a coarse carbonaceous material in a dilute phase fluidization system.

U.S. Pat. No. 4,017,304 to Glaeser teaches essentially the same process discussed in the four previous Glaeser patents.

U.S. Pat. No. 4,046,853 to Robinson teaches the simultaneous chlorination of the iron and titanium values in an iron-containing titaniferous ores such as ilmenite. Here, the ilmenite is converted to ferrous chloride, but the resulting gaseous effluent is difficult to process to recover the titanium tetrachloride. The iron values in the effluent are partially oxidized to $Fe_2O_3$ and $FeCl_3$ thereby reducing the partial pressure of the ferrous chloride while maintaining the presence of some ferrous chloride to scavenge any chlorine emitted from the chlorination stage. The residual gaseous iron chlorides are condensed and chlorine free titanium tetrachloride may be recovered from the remaining gases.

U.S. Pat. No. 4,055,621 to Okudaira teaches a process for obtaining chlorine from iron chloride from chlorination of titaniferous ore by adding iron oxide to iron chloride in an amount above 10% by weight of the resulting mixture, charging the mixture into a fluidizing roasting furnace for oxidation, any overflow being oxidized in a second reactor. The iron oxide thus obtained is recycled to the primary reactor for controlling the reaction temperature in the furnace.

U.S. Pat. No. 4,140,746 to Turner et al. relates to the recovery of chlorine values from iron chloride produced from the chlorination of titaniferous material containing iron and particularly from the carbo-chlorination of ilmenite which, for example, can be the first stage in the so-called chloride route to form titanium dioxide pigment. The iron chloride which may be ferric chloride or ferrous chloride is subjected to a combination of reduction and oxidation reactions. In the reduction reaction, ferric chloride is dechlorinated to ferrous chloride by a reducing agent suitable for producing a chloride compound for recycle to the chlorination process. In the oxidation reaction ferrous chloride is oxidized to ferric oxide and ferric chloride, ferric chloride being recycled to the reduction reaction. By this method the chlorine values are recovered from the by-product iron chloride by a route which avoids the difficult reaction between ferric chloride and oxygen to produce chlorine and ferric oxide.

U.S. Pat. No. 4,174,381 to Reeves et al. teaches an improved process and an apparatus for producing chlorine and iron oxide in a multistage recirculating fluidized bed reactor wherein ferric chloride in the vapor phase is reacted with an excess of oxygen at temperatures of from 550° to 800° C. The improvement comprises utilizing a reactor that includes an initial "dense" zone and a downstream "dilute zone". In the dense zone, a fuel is burned, reactants and recirculated iron oxide particles are heated, ferric chloride is vaporized and at least 50% of the ferric chloride is converted to chlorine and iron oxide. In the downstream dilute zone, the conversion of ferric chloride is continued to greater than 95% completion.

U.S. Pat. No. 4,183,899 to Bonsack teaches a process whereby an iron containing titaniferous material is chlorinated with chlorine for producing a product stream of titanium chlorides and by-product metallic iron in a liminar flow process.

U.S. Pat. No. 4,279,871 to Bonsack teaches the removal of vanadium impurities in chlorinated titaniferous materials by reacting the chlorinated titaniferous materials with a high surface area carbon at an elevated temperature. A process for preparing the high surface carbon is also described.

U.S. Pat. No. 4,310,495 to Bonsack teaches low temperature (less than 800° C.) process for chlorinating titaniferous material in a fluidized bed. A porous carbon reductant having micropores with a pore diameter of less than 20 angstroms is utilized together with conventional titaniferous material and conventional chlorine sources to achieve reaction at the present low temperatures.

U.S. Pat. No. 4,329,322 to Bonsack et al. teaches a process for the removal of vanadium impurities in a chlorinated titaniferous material by reacting the titaniferous material with a high surface area carbon during the chlorination process.

U.S. Pat. No. 4,343,775 to Bonsack teaches a flow process for the chlorination of titaniferous materials. This process utilizes a special microporous carbon (anthracite) characterized by having pores with a pore diameter of less than 20 anagstroms. Improved reaction rates and completeness of reaction are achieved.

U.S. Pat. No. 4,442,076 to Bonsack discloses a process for the entrained downflow nonselective chlorination of fine iron-containing titaniferous material with chlorine gas and/or organochlorides in the presence of fine porous coal based reductant powder for obtaining product chlorides of titanium and iron wherein the combined powders are entrained in and flow downwardly through a chlorination zone at a temperature of at least about 800° C. In the present process similar conditions are used except that the chlorinating agent is $FeCl_3$ instead of chlorine gas or an organochloride. (See also U.S. Pat. No. 4,343,775 to Bonsack, supra.).

As can be seen from the prior art above, in various methods for chlorinating titaniferous materials, e.g., ilmenite rutile, and titaniferous slags, to produce $TiCl_4$ and $FeCl_2$ or $FeCl_3$, chlorine is generally the chlorinating agent, and chlorine is recovered from $FeCl_2$ or $FeCl_3$ by oxidation to $Cl_2$ and $Fe_2O_3$. In the present case, the charge of titaniferous material is divided into two portions, each of which is treated differently. The first is chlorinated by any conventional process using chlorine or a chlorine rich gas as the chlorinating agent to yield $FeCl_2$ or $FeCl_3$ and $TiCl_4$. A second smaller portion is chlorinated to $TiCl_4$ and $FeCl_2$ in a dilute phase reactor with $FeCl_3$ from the first stage and/or recovered from a partial oxidation step wherein by-product $FeCl_2$ from both chlorination stages is partially oxidized to $FeCl_3$ and $Fe_2O_3$. In this process all chlorine values are utilized in the production of $TiCl_4$.

The present invention provides, therefore, an improved process for producing $TiCl_4$, a product useful in and of itself as a catalyst, or as a precursor to the production of high purity pigment grade titanium dioxide. Problems attendant disposal of by-products such as $FeCl_2$ or $FeCl_3$ are avoided.

BRIEF STATEMENT OF THE INVENTION

Briefly stated, the present invention is a process for making $TiCl_4$ by chlorinating from 60% to 90% of an iron-containing titaniferous material in a first chlorination zone with a chlorinating agent, e.g., chlorine and a carbon reductant under nonselective chlorination conditions to yield $TiCl_4$, iron chloride and carbon oxides; separating the iron chloride as a solid from the $TiCl_4$ and carbon oxides; nonselectively chlorinating from 10% to 40% of said iron-containing titaniferous material in a second isolated chlorination zone with ferric chloride chlorinating agent and a carbon reductant to produce a second stream containing $TiCl_4$, ferrous chloride and carbon oxides; separating the ferrous chloride as a solid from the $TiCl_4$ and carbon oxides from said second chlorination zone; oxidizing the solid ferrous chloride with molecular oxygen at a temperature below the melting point of $FeCl_2$ to yield $FeCl_3$ vapor and $Fe_2O_3$; recycling at least a part of the ferric chloride vapor to the second isolated chlorination zone, and combining the product $TiCl_4$ from the first and second chlorination zones.

In a more specific embodiment of the invention, chlorination in the first chlorination zone is carried out under conventional fluidized bed chlorination conditions with chlorine at about 800° to 1100° C., preferably 1000° C. and chlorination in the second chlorination zone is carried out under entrained flow chlorination conditions (See conditions in U.S. Pat. No. 4,343,775 excepting the chlorinating agent) with $FeCl_3$ at about 900° C. to 1400° C. preferably 1150° C. For fluidized bed chlorination, the particle size of the ore can be relatively coarse, i.e., −20 +140 mesh (U.S. Standard Screen Size). Under entrained flow conditions in the second isolated reactor, the particle size of the ore is desirably very fine, i.e., −325 mesh or about 10 to 40 microns.

Throughout this specification and claims the term "product" $TiCl_4$ will be understood as that $TiCl_4$ produced in the process under consideration to distinguish it from liquid $TiCl_4$ used to quench various gas streams, which quenching $TiCl_4$ may itself have been previously produced in or according to the present process.

BRIEF DESCRIPTION OF THE DRAWINGS

For a better understanding of the invention, reference may be had to the annexed drawings wherein.

DETAILED DESCRIPTION OF THE INVENTION

Although a common method in the art involves chlorination of an iron-containing titaniferous material in a single reactor (fluid bed, entrained flow, or other type) with $Cl_2$ or a mixture of gases including $Cl_2$, the present process is distinguished from prior efforts in that chlorination of a predetermined amount of ore is done in two stages: (a) 60–90% of the ore is chlorinated by a conventional process with $Cl_2$ as the sole or primary chlorination agent; and (b) 10–40% of the ore is chlorinated in a second isolated dilute phase reactor with $FeCl_3$ vapor as the chlorination agent. The $FeCl_3$ is produced primarily by partial oxidation of $FeCl_2$ to $FeCl_3$ and $Fe_2O_3$. The chemical balance between the conventional chlorination and the chlorination by $FeCl_3$ is such that all the chlorine not utilized in forming $TiCl_4$ is recovered as a recyclable chlorinating agent. Iron impurities are recovered as readily disposible material ($Fe_2O_3$).

Figure 1:
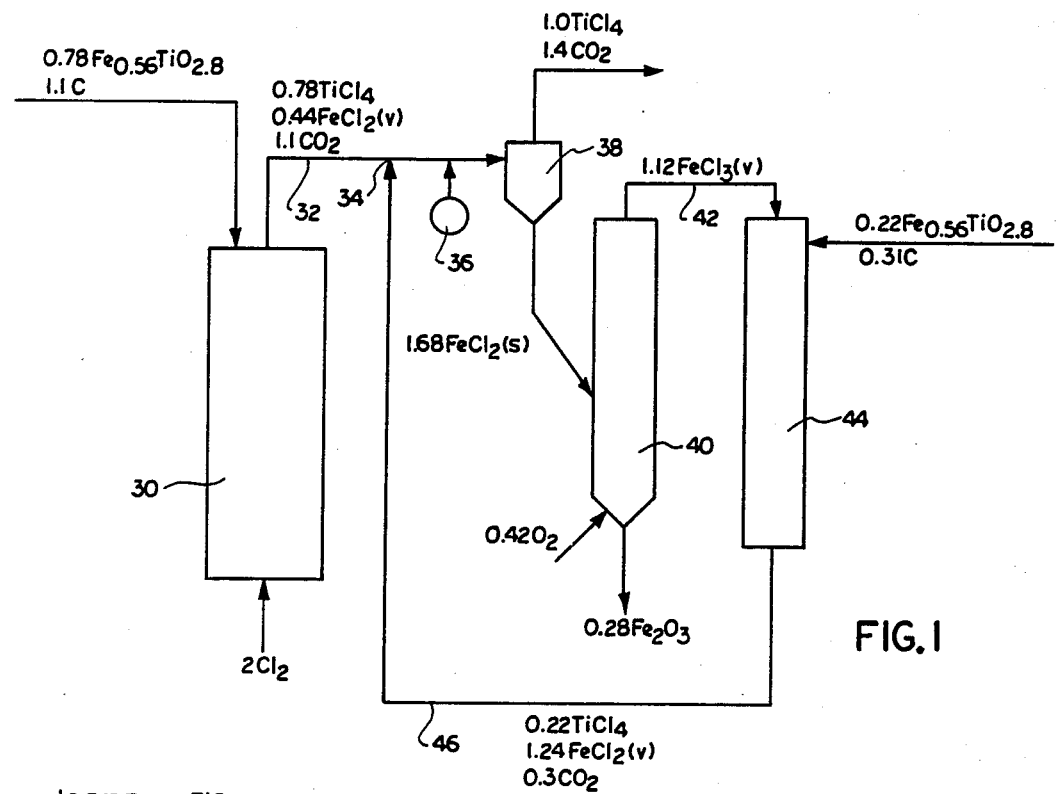
FIG. 1 is a diagrammatic and schematic illustration of an apparatus for carrying out the invention wherein the iron chloride produced in the first chlorination zone is $FeCl_2$. Numerical values for the compounds are in mole %.
Figure 2:
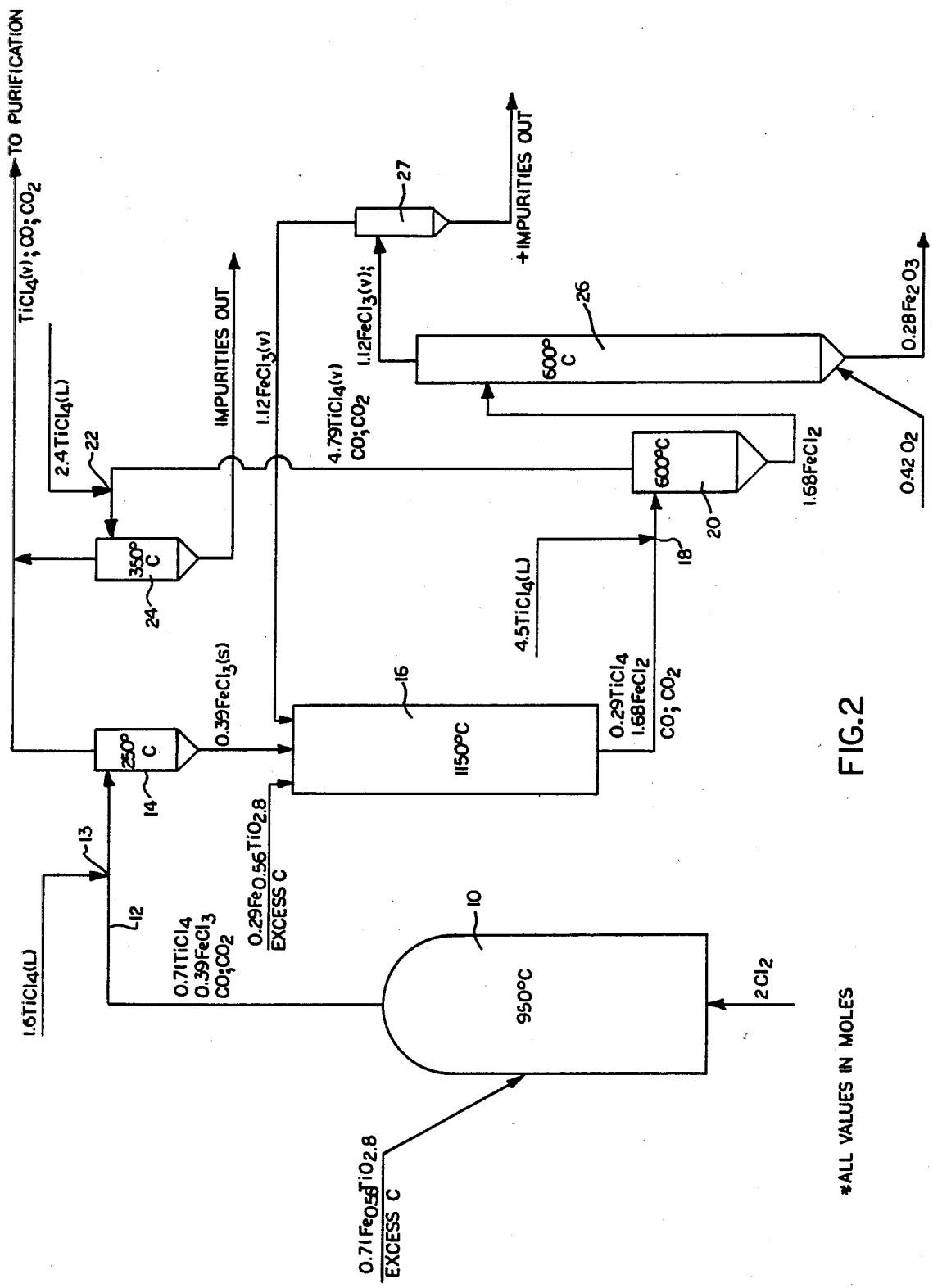
FIG. 2 is a diagrammatic and schematic illustration of another embodiment of the invention wherein the iron chloride produced in the first chlorination stage is $FeCl_3$.

The relative amounts of ore charged to each chlorinator, 30 and 10 in FIGS. 1 and 2, is dependent upon the Fe/Ti atomic ratio in the ore. FIG. 4 shows the relationship between the ore composition and the amount of ore to be chlorinated in the primary chlorinator. The curve A is obtained when the iron chloride produced in the primary chlorinator 30 is $FeCl_2$ (see FIG. 1). The curve B is obtained when the iron chloride produced in the primary chlorinator 10 is $FeCl_3$ (See FIG. 2). For practical purposes, operation is between the two curves A and B and both $FeCl_2$ and $FeCl_3$ are produced as exemplified in FIG. 3.

A typical iron-containing titaniferous ore is an ilmenite ore with a Fe/Ti atomic ratio of 0.56 where Fe/Ti ratio requires 78 mole percent of it being sand-sized (−20 +140 mesh) for a first stage chlorination in a fluidized bed producing $TiCl_4$ and $FeCl_2$. The remaining 22 mole percent is ground to −325 mesh for a second stage entrainedd flow chlorination using $FeCl_3$ as a chlorinating agent.

The major amount, e.g., a 0.78 mole portion, is nonselectively chlorinated in a first stage zone for producing $TiCl_4$, $CO_2$, CO and ferrous chloride; the off-gas contains at most only a few percent ferric chloride. Preferably gaseous chlorine and the cheapest available carbon (presently petrolum coke) are used in a conventional fluidized bed chlorinator.

Overhead from the first stage chlorinator (with some entrained ore and carbon solids) is quenched with liquid $TiCl_4$ to a temperature of about 500°–600° C. to condense ("snow-out") ferrous chloride-rich particles. This is separated (along with any entrained solids present) from the remaining vapor stream. Crude $TiCl_4$ subsequently is condensed from such remaining vapor stream.

In the second stage chlorination zone, preferably an entrained flow (EFC) operation, ferric chloride vapors from a later stage of the process constitute the vapor phase chlorinating agent for the minor or remaining portion (22%) of the ore feed. The EFC effluent products are $TiCl_4$, $CO_2$, CO, and ferrous chloride. Advantageously, the added carbon here is a reactive (porous) one. (See U.S. Pat. No.: 4,329,322 for discussion of useful porous carbons). The EFC effluent is quenched to about 500° C. to 600° C. with liquid $TiCl_4$ as a spray to condense solid ferrous chloride for submission to partial oxidation. The resulting ferrous chloride particles are separated from the remaining vapors. Then those vapors are requenched to about 350° C. with additional liquid $TiCl_4$ to separate $TiCl_4$ and carbon oxide vapors from waste solids, which are essentially iron-free. Crude $TiCl_4$ subsequently is condensed from the remaining vapor stream.

Ferrous chlorde with or without $FeCl_3$ condensed therewith from the first and second chlorinating stages is then partially oxidized with molecular oxygen into solid ferric oxide and ferric chloride vapor. The ferric oxide is separated and collected; ferric chloride vapor is recycled to the second stage chlorination as part of the chlorinating agent therefor.

Representative equations for this case are:

FIRST STAGE CHLORINATION $$2FeTiO_3 + 6Cl_2 + 3C \rightarrow 2TiCl_4 + 3CO_2 + 2FeCl_2 \quad \text{(I)a}$$

$$2FeTiO_3 + 7Cl_2 + 3C \rightarrow 2TiCl_4 + 3CO_2 + 2FeCl_3 \quad \text{(I)b}$$

$$2FeTiO_3 + 6Cl_2 + 6C \rightarrow 2TiCl_4 + 6CO + 2FeCl_2 \quad \text{(II)a}$$

$$2FeTiO_3 + 7Cl_2 + 6C \rightarrow 2TiCl_4 + 6CO + 2FeCl_3 \quad \text{(II)b}$$

SECOND STAGE CHLORINATION $$2FeTiO_3 + 12FeCl_3 + 3C \rightarrow TiCl_4 + 3CO_2 + 14FeCl_2 \quad \text{(III)}$$

$$FeTiO_3 + 6FeCl_3 + 3C \rightarrow TiCl_4 + 3CO + 7FeCl_2 \quad \text{(IV)}$$

FERROUS CHLORIDE OXIDATION $$12FeCl_2 + 3O_2 \rightarrow 2Fe_2O_3 + 8FeCl_3$$

FIG. 1 shows a schematic process flow diagram for carrying out the invention when the iron chloride produced in the primary chlorinator is $FeCl_2$. Numerical values for the compounds are in moles. Australian ilmenite ore is the iron-containing titaniferous ore used in the illustrated process. It has an analysis corresponding to the empirical formula $Fe_{0.56}TiO_{2.8}$. This Australian ore which is obtained as a sand size material ($-40 + 140$ mesh, as mined). The original charge of ore is divided into two parts. A 0.78 mole portion of titaniferous ore, $Fe_{0.56}TiO_{2.8}$, and a 1.1 mole portion of petroleum coke (or brown coal, or anthracite coal; $-6 + 40$ mesh) is fed to the chlorinator 30 under fluidized bed conditions and at 950° C. Nitrogen may be used as a diluent for the chlorinating gas. A 2 mole portion of chlorine gas is introduced and nonselective chlorination carried out in a conventional manner. The overhead gas stream 32 is composed of 0.78 mole product $TiCl_4$, 0.44 mole $FeCl_2$ and 1.1 mole of carbon oxides expressed as $CO_2$. The gas stream 32 is joined at 34 with more $TiCl_4 + FeCl_2$ as described below then spray cooled or quenched with liquid $TiCl_4$ to about 600° C. to "snow out" the $FeCl_2$ while maintaining the $TiCl_4$ in a vapor state. Separation of the solid and gas phases is accomplished in a cyclone separator 38. The combined product $TiCl_4$ amounts to 1.0 mole and carbon oxides as $CO_2$ are 1.4 moles. The $TiCl_4$ is then cooled and subsequently purified by conventional means.

The solid $FeCl_2$ separated from the gas stream of $TiCl_4$ is conducted to an oxidizer 40 where it is partially oxidized with a 0.42 mole portion of $O_2$ or an equivalent amount of air. This reaction produces rather completely a 0.28 mole portion of $Fe_2O_3$, which is disposible, and a 1.12 mol portion of $FeCl_3$ as a vapor. The $FeCl_3$ is fed through a duct 42 to the top of a dilute phase entrained flow chlorinator 44 where it is contacted with a 0.22 mole portion of the ilmenite ore ground to $-325$ mesh (i.e., the balance of the original one mole of ore) and chlorinated under entrained flow chlorinating conditions in the presence of carbon, e.g., petroleum coke, of similar particle size, at a temperature of about 1100° to 1300° C., e.g., 1150° C. The gaseous product consisting of a 0.22 mole portion of $TiCl_4$, a 1.24 mole portion of $FeCl_2$ as a vapor, and a 0.3 mole portion of carbon oxides calculated as $CO_2$ is conducted by conduit 46 to the juncture 34 where it is blended with the off-gases from the fluid bed chlorinator 30, and treated as indicated above.

When a mixture of $FeCl_2$ and $FeCl_3$ is produced in the primary chlorinator, the schematic flows are similar to those in FIG. 1 with the following exceptions:

(1) The amount of ore charged to the primary chlorinator will depend on the $FeCl_2/FeCl_3$ ratio. For example, a 50/50 mole ratio would fall at the midpoint between the curves in FIG. 4. For an ore with the composition used in FIGS. 1 and 2 ($Fe_{0.56}TiO_{2.8}$), 74.5 mole percent of the ore would be charged to the primary chlorinator and 25.5 mole percent would be charged to the secondary chlorinator.

(2) Liquid $TiCl_4$ quench 36 would cool combined streams 32 and 46 to 150°–300° C. to condense both $FeCl_3$ and $FeCl_2$.

(3) Solid $FeCl_3$ then charged to partial oxidizer 40 would vaporize and accompany newly produced $FeCl_3$ vapor, both of which would be conveyed through line 42 to the secondary chlorinator.

Figure 3:
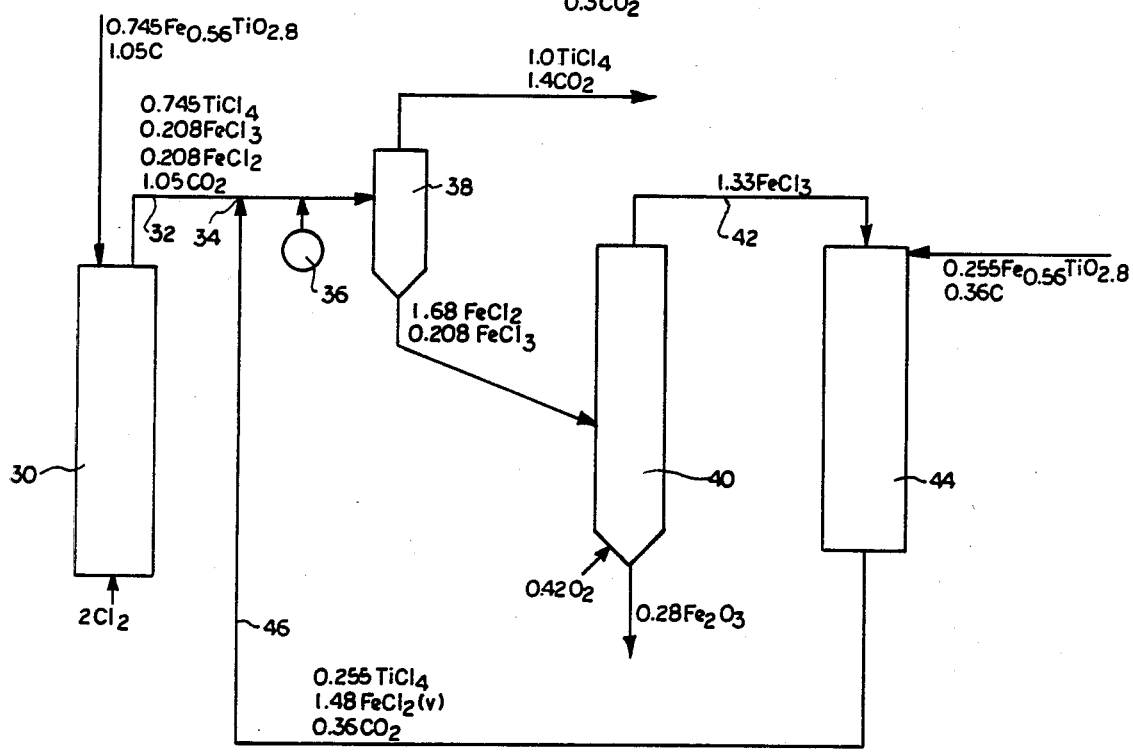
FIG. 3 is a diagrammatic and schematic illustration of another embodiment of the invention wherein a 50:50 mole ratio mixture of $FeCl_2/FeCl_3$ is produced in the first chlorination stage.
Figure 4:
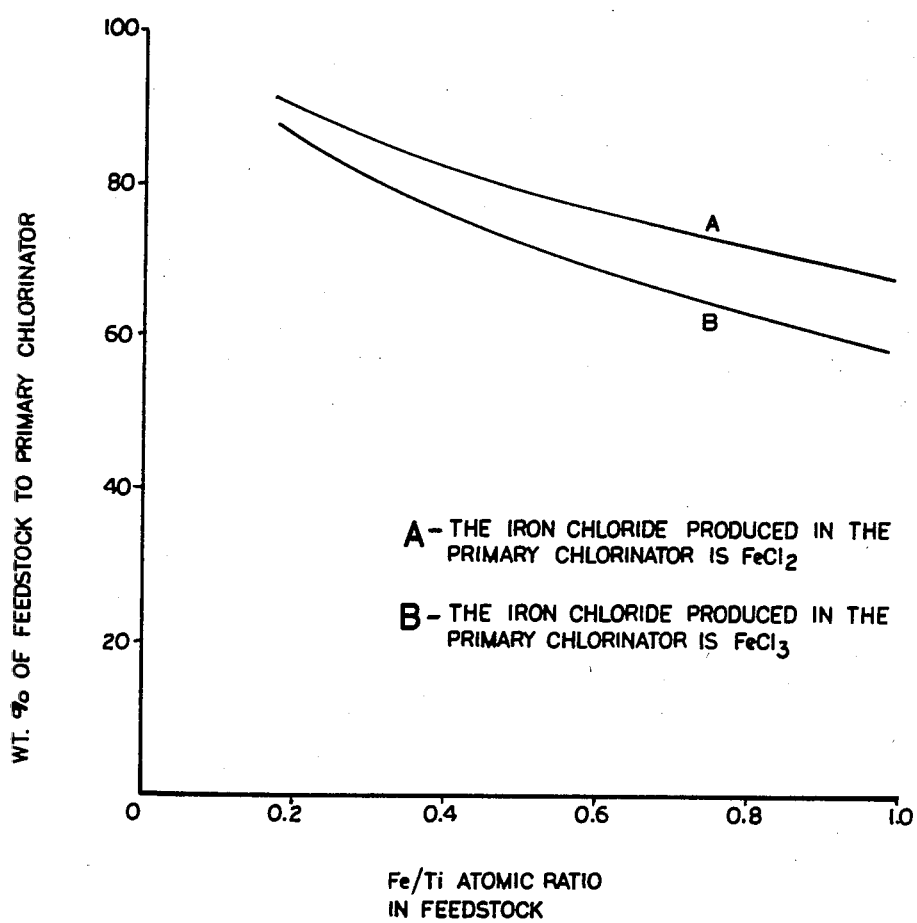
FIG. 4 is a graph showing the relationship between the atomic ratio of iron to titanium to the weight percent of feedstock to the primary chlorinator.

A schematic and diagrammatic diagram for the foregoing is shown in FIG. 3.

From a practical point of view, the arrangement shown in FIG. 3 may be used for any Fe/Ti ratio. Thus, whether the product of the fluid bed chlorination is $FeCl_2$, FIG. 1, or $FeCl_3$, or a mixture of $FeCl_2/FeCl_3$, all of the solid iron chloride is conveniently charged to the partial oxidation unit. The precise control required to operate precisely on curve A of FIG. 4 or on curve B is not realized in practice.

Referring to FIG. 2, there is here shown in diagrammatic and schematic form a process flow sheet for the preferred mode of carrying out our invention wherein $FeCl_3$ is produced in the primary chlorinator.

A 0.71 mole portion is introduced into a conventional fluidized bed reactor 10 from the side along with petroleum coke, anthracite or brown coal ($-6$ to $+40$ mesh). The amount of carbon is desirably in slight excess over stoichiometric and what is stoichiometric depends on whether CO or $CO_2$ or a mixture of CO and $CO_2$ (See equations I and II above) is the desired end product. A two mole portion of chlorine gas is introduced at the bottom of the reactor 10 and the rate adjusted for fluidization and complete nonselective chlorination of the metal values in the ore. The reaction temperature is 800°–1100° C., e.g., 1000° C.

The vaporous reaction products are indicated in the drawing which are carried by a suitable conduit 12 to a liquid $TiCl_4$ spray cooler 13 wherein the temperature of the gas is reduced sufficiently, e.g., 250° C. to condense $FeCl_3$ as solid particles, while maintaining the $TiCl_4$ and carbon oxides in the gaseous state. The mixture is separated in a cyclone separator 14. There are obtained 0.71 mole of $TiCl_4$ vapor, 0.39 mole of $FeCl_3$ solid and 1.0 mole of carbon oxides (as $CO_2$). The combined spray and product $TiCl_4$ is taken off overhead for combination with $TiCl_4$ produced from the second portion of ore in the second stage described below.

The balance of the ore (0.29 mole portion) is ground to an average particle size of from 10 microns to 40 microns and along with powdered carbon of similar size (10 to 40 microns) is introduced into a downwardly directed entrained flow reactor 16 for chlorination with vapor $FeCl_3$ from the following oxidation step and recovered "snowed out" solid $FeCl_3$ from the previous chlorination step. The amount of carbon is slightly in excess of stoichiometric depending on whether CO or $CO_2$ or a mixture of CO and $CO_2$ (See equations III and IV above) is the desired end product. This operation results in the production of a 0.29 mole portion of $TiCl_4$, a 1.68 mole portion of FeCl$_2$ and carbon oxides. The gaseous efflux from chlorinator 16 is cooled with a spray of liquid TiCl$_4$ at 18 to a temperature of about 500° C. to 600° C. which causes the FeCl$_2$ to "snow out" of the gas steam as a dusty solid. The solid and gaseous phases are separated in a suitable cyclone separator 20.

The gaseous TiCl$_4$ is further cooled with liquid TiCl$_4$ spray at 22 and the gas and any waste solids separated in a cyclone separator 24. The crude product TiCl$_4$ exhausted from separator 24 is combined with the product TiCl$_4$ from chlorinator 10 to yield a 1.0 mole portion of crude product TiCl$_4$ along with cooling TiCl$_4$ and carbon oxides.

The solid FeCl$_2$ from the entrained flow chlorinator 16 is then introduced into an oxidizer 26 where it is partially oxidized ("partial" in that the oxygen is limited so that complete oxidation to Cl$_2$ is not accomplished). This partial oxidation yields a 0.28 mole portion of Fe$_2$O$_3$ and a 1.12 mole portion of FeCl$_3$. Oxygen or air is introduced into the bottom of a suitable reactor 26, to effect the oxidation according to the equation:

$$12FeCl_{2(s)} + 3O_2 \rightarrow 8FeCl_{3(v)} + 2Fe_2O_{3(s)}$$

In this oxidation step, only that amount of O$_2$ is used to yield Fe$_2$O$_3$ and FeCl$_3$ vapor plus that required to burn carbon to CO$_2$ if extra heat is required as in a commercial scale oxidizer. This is in contrast to most prior art processes which attempt to force the oxidation to completion to yield Cl$_2$ and Fe$_2$O$_3$. These are separated at about 600° C. in a cyclone separator 27.

FeCl$_2$ oxidation is relatively fast around 600° C. where FeCl$_3$ and Fe$_2$Cl$_6$ oxidation is slow. From the data in Examples 1, 2 and 3 in Table I, it was calculated that FeCl$_2$ oxidation goes essentially to completion at 600° C. in as little as 2.4 seconds.

Thermodynamic calculations indicate that FeCl$_2$ oxidation is quite favorable in the 350°–650° C. range; that is, the reaction goes essentially to completion.

Thermodynamic calculations also indicate that the ferric chloride vapor produced by the oxidation reaction is mainly dimeric (Fe$_2$Cl$_6$) rather than monomeric (FeCl$_3$). At 600° C., 80 mole percent of the Fe(III) exists as dimer; at 400° it is about 98%. So the more correctly written oxidation equation should be:

$$12FeCl_{2(s)} + 3O_2 \rightarrow 4Fe_2Cl_{6(v)} + 2Fe_2O_3$$

with only a minor contribution from:

$$12FeCl_{2(s)} + 3O_2 \rightarrow 8FeCl_{3(v)} + 2Fe_2O_3.$$

Oxidation reactions were carried-out in a vertical quartz reactor tube 122 mm in length, about 20 mm ID, with a gas inlet at the bottom and a gas outlet at the top. The reactor tube was held at the desired temperature along 60 mm of its length by an electrical resistance heater. A bed of coarse silica sand was placed in the bottom of the reactor tube to support a bed of FeCl$_2$ powder in the 60 mm hot zone.

A bed of FeCl$_2$ powder (175 mm av. dia.) was poured into the reactor tube, while flowing 1000 cm$^3$/min. of N$_2$ up through the tube, to give an FeCl$_2$ bed about 28 mm in height containing from 2.0 to 2.3 grams FeCl$_2$ per mm of height. The reactor was heated to the desired temperature with the N$^2$ flow on. After reaching the desired temperature, the N$_2$ flow was stopped, a Teflon gas collection bag was attached to the top reactor gas outlet, and O$_2$ was admitted. The O$_2$ flow rate was adjusted to give a superficial O$_2$ velocity up through the tube of 10 mm per second in Examples 1, 2 and 3, and 5 mm per second in Example 4. (Calculated assuming an empty reactor tube, but corrected for temperature). After the amount of O$_2$ needed to react with 15 to 17 grams of FeCl$_2$ (equivalent to about 7.6 mm of bed height) was added, the O$_2$ flow was stopped and N$_2$ at the same flow rate as O$_2$ was started. The N$_2$ flow was stopped after a sufficient amount was added to purge unreacted O$_2$ and any Cl$_2$ into the gas collection bag.

The contents of the gas collection bag were analyzed for percent N$_2$, O$_2$, and Cl$_2$ (and CO and CO$_2$ when carbon was present) by gas chromatography. From these results and the volume of N$_2$ metered to the Teflon bag, the volumes of O$_2$ and Cl$_2$ (and CO and CO$_2$ when carbon was present) were calculated.

After calculating the actual amount of FeCl$_2$ reacted, this quantity of fresh FeCl$_2$ powder was added to the top of the FeCl$_2$ bed with N$_2$ flowing as before. Another 15 to 17 g FeCl$_2$ was reacted and the procedure was repeated.

As Fe$_2$O$_3$ built-up in the lower section of the FeCl$_2$ bed, the reactor tube was lowered through the heater to keep the bed of unreacted FeCl$_2$ in the heated zone. Fe$_2$Cl$_6$ vapor condensed in the cool section of the reactor tube between the heater and the gas collection bag. This was removed occasionally to prevent pluggage of the tube.

After 2 to 3 bed displacements (120 to 200 g FeCl$_2$) had been reacted (and added) the experiment was stopped. The results from each added portion of FeCl$_2$ was then averaged.

The average FeCl$_2$ bed height was 24 mm. The average superficial O$_2$ contact time was 2.4 seconds in Examples 1, 2 and 3 and 4.8 seconds in Example 4.

EXAMPLE 1

In this run, the reaction was carried out at 490° C. Conditions and results are given in Table I.

EXAMPLE 2

In this run, the reaction was carried-out at 525° C. Conditions and results are given in Table I.

EXAMPLE 3

In this run, the reaction was carried-out at 600° C. Conditions and results are given in Table I.

EXAMPLE 4

In this run, which is a part of the best mode presently known to us for carrying out our invention, carbon is added to the charge of FeCl$_2$ and the reaction carried out at 600° C. One mole of carbon was mixed with each eight moles of FeCl$_2$. Conditions and results are given in Table I. The carbon was a brown coal char ground to less than 75 microns particle diameter and having a specific surface area of 370 m$^2$/g. (See U.S. Pat. No. 4,329,322).

The Examples illustrate a packed bed reactor where the particles move downward against an upward counter-current flow of O$_2$ or air. In a practical operating system, Fe$_2$O$_3$ powder is continuously discharged at the bottom as by a star valve. The average particle size of the Fe$_2$O$_3$ powder was approximately 10 microns and was a dull gray nonlusterous powder. FeCl$_3$ flow out of the oxidizer as a vapor.

Note that the reaction of $O_2$ with $FeCl_2$ is essentially complete at the higher temperatures. These results show that the $O_2$/$FeCl_2$ reaction is fast and selective for $FeCl_2$.

Comparing Examples 3 and 4 in Table I, it is seen that the presence of carbon in Example 4 reduced the amount of oxygen reacting with $Fe_2Cl_6$ from 1.1% to 0.16%, and reduced the amount of unreacted oxygen from 0.3 to 0.02%.

The oxidation step of $FeCl_2$ to $FeCl_3$ of the ilmenite chlorination process hereof is not limited to packed bed type reactors. Other reactor types, appropriate for oxidation of solid $FeCl_2$ are also useful. The use of a packed bed type system in the Examples serve to illustrate the efficiency of the $O_2$/$FeCl_2$ reaction when a large excess of solid $FeCl_2$ over oxygen is present in the oxidation reactor. This improved oxidation procedure is the subject of a commonly owned application by Bonsack, Ser. No.: 638,098 filed Aug. 8, 1984. For use in the process shown in FIGS. 1, 2 and 3, we prefer to oxidize the $FeCl_2$ in the presence of added carbon, particularly in commercial scale apparatus to provide heat internally to this endothermic reaction. Such heat can be provided in a small scale reactor from an external source. The amount of carbon will depend on the scale of the equipment, but will be that amount which will maintain the reaction temperature within the preferred range of 525° C. to 600° C.

TABLE I

| Example | | 1 | 2 | 3 | 4 |
|---|---|---|---|---|---|
| | | No. | | | |
| Temperature | °C. | 490 | 525 | 600 | 600 |
| Reactor ID | cm | 2.25 | 2.25 | 1.93 | 2.25 |
| $O_2$ Flow Rate | cm³/min. | 920 | 882 | 598 | 404 |
| Flow Time | seconds | 53 | 53 | 72 | 202 |
| Total Volume $O_2$ | cm³ | 810 | 787 | 712 | 1350 |
| $N_2$ Flow Rate | cm³/min. | 920 | 882 | 598 | 404 |
| Flow Time | seconds | 211 | 214 | 179 | 309 |
| Total Volume $N_2$ | cm³ | 3239 | 3146 | 1779 | 2082 |
| AV. Vol. % $N_2$ | | 94.6 | 98.2 | 99.0 | 81.5 |
| AV. Vol. % $O_2$ | | 3.9 | 0.61 | 0.11 | .01 |
| AV. Vol. % $Cl_2$ | | 0.34 | 0.51 | 0.84 | 0.17 |
| AV. Vol. % CO | | | | | 3.6 |
| AV. Vol. % $CO_2$ | | | | | 14.6 |
| AV. Volume $O_2$ | cm³ | 134.0 | 19.9 | 2.2 | 0.3 |
| AV. Volume $Cl_2$ | cm³ | 11.3 | 16.3 | 15.1 | 4.4 |
| AV. Volume CO | cm³ | | | | 90.0 |
| AV. Volume $CO_2$ | cm³ | | | | 380.0 |
| % $O_2$ Reacting with $Fe_2Cl_6$ a | | 0.7 | 1.0 | 1.1 | 0.16 |
| % $O_2$ Not Reacting | | 16.5 | 2.5 | 0.3 | 0.02 |
| % $O_2$ Reacting with $FeCl_2$ b | | 82.8 | 96.5 | 98.6 | 68.3 |
| % $O_2$ Reacting with Carbon | | | | | 31.5 | a Each 2 moles $Cl_2$ found required one mole of $O_2$ according to $2Fe_2Cl_6 + 3O_2 \rightarrow 6Cl_2 + 2Fe_2O_3$
b By difference.

To illustrate the second stage chlorination of ilmenite, a pilot plant was used to carry out the second-stage operation. It consisted of three major units:

(a) Ferric chloride generator.
(b) Chlorinator (entrained-flow type)
(c) Scrubbing system.

Second stage chlorination of ilmenite took place in a vertical mullite ($3Al_2O_3 \cdot 2SiO_2$) tubular reactor 2800 mm in length and 160 mm ID with an inlet device at the top and outlet at the bottom. The necessary heat to sustain the reaction at the desired temperature was provided by an external electrical furnace.

Gaseous $FeCl_3$ entered the reactor at the top along with the mixture of ground ilmenite and coal and $N_2$ (which is used as a solids carrier and to purge various points). The solids were fed at a steady rate by the Gravimetric Acrison Feed Model 403 with Micro-data microprocessor controller.

For convenience in this study, ferric chloride was generated in a two chamber reactor by attacking iron with chlorine (according to the well known reaction). The rate of $FeCl_3$ generation was controlled by the flow rate of $Cl_2$.

The flows of $Cl_2$ as well as $N_2$ were controlled by rotameters.

The gaseous products of the reaction, along with unreacted ilmenite and coal, entered the scrubber where they were scrubbed by an 0.1N aqueous solution of $H_2SO_4$.

The scrubbing solution was analyzed for unreacted $FeCl_3$ ($Fe^{+3}$), which indicated the degree of reaction completion.

In the experiments there were used Australian ilmenite ($TiO_2$—60.69% $Fe_2O_3$—30.58% FeO—4.95%) and brown coal char obtained from Australian Char PTY-LTD. Ilmenite and coal were premixed at the weight ratio 50:50 and ground together to the median particle size 10.9 microns.

The conditions and results of four experiments are described in Table II. The approximate retention time in all experiments was 30 seconds.

TABLE II

| Experiment | | 1 | 2 | 3 | 4 |
|---|---|---|---|---|---|
| | | No. | | | |
| Temperature | °C. | 1250 | 1150 | 1050 | 1250 |
| Solid Feed Rate | Lb/hr. | 1.9 | 1.5 | 1.9 | 1.9 |
| $FeCl_{3(v)}$ Flow Rate | L/min. | 4.7 | 4.7 | 4.7 | 4.7 |
| $N_2$ Flow Rate (Total) | L/min. | 4.17 | 4.8 | 5.8 | 5.8 |
| % Reaction | % | 100 | 92.6 | 96.6 | 96.25 |

Although in the foregoing exemplary runs $FeCl_3$ was generated as indicated, $FeCl_2$ recovered from the second stage chlorination hereof will be oxidized to $FeCl_3$ and the resulting $FeCl_3$ vapor recycled to the second stage operation in the manner illustrated above.

What is claimed is:

1. A process for making $TiCl_4$ from an iron containing titaniferous ore comprising:
    (a) nonselectively chlorinating 60% to 90% of said ore in the presence of carbon with chlorine in a conventional fluid bed chlorinator under conventional fluid bed chlorination conditions at a temperature of from 800° to 1100° C. to yield a primary gaseous stream containing $TiCl_4$, carbon oxides, and either $FeCl_2$ or $FeCl_3$, or a mixture thereof;
    (b) cooling the primary gaseous stream from (a) above to a temperature below 325° C. sufficient to separate iron chloride(s) as a solid from the product $TiCl_4$-containing primary gaseous stream while maintaining the $TiCl_4$ in the vapor state;
    (c) nonselectively chlorinating the remaining 10% to 40% of the ore at a temperature of from 900° to 1400° C. in the presence of carbon with ferric chloride vapor from step (h) below, under entrained flow chlorination conditions to yield a secondary gaseous stream of product $TiCl_4$, carbon oxides, and ferrous chloride;
    (d) cooling the secondary gaseous stream from (c) above to a temperature below 675° C. sufficient to separate ferrous chloride as a solid from the product $TiCl_4$-containing secondary gaseous stream while maintaining the $TiCl_4$ in the vapor state;
(e) combining any ferrous chloride with or without ferric chloride obtained in step (b) with ferrous chloride obtained from step (d);
(f) converting solid ferrous chloride from step (e) above by partial oxidation with molecular oxygen at a temperature of 325° C. to 675° C. to $Fe_2O_3$ and $FeCl_3$ vapor and vaporizing any solid $FeCl_3$ from step (b) above if present;
(g) separating the $FeCl_3$ vapor from said $Fe_2O_3$;
(h) returing $FeCl_3$ obtained in step (g) together with any $FeCl_2$-free iron chloride obtained in step (b) to step (c) above; and
(i) combining the product $TiCl_4$ from the primary and secondary gaseous streams.

2. A process as defined in claim 1 wherein said molecular oxygen is a component of air.

3. A process as defined in claim 1 wherein solid iron chloride is isolated from the primary and secondary gaseous $TiCl_4$-containing product streams by quenching the streams with liquid $TiCl_4$, respectively, to a temperature sufficient to precipitate the iron chloride.

4. A process as defined in claim 1 wherein Step (e) is combining any ferric chloride with or without ferrous chloride obtained in step (b) with ferrous chloride obtained from step (d).

5. A process for making $TiCl_4$ from an iron-containing titaniferous ore comprising:
(a) nonselectively chlorinating 60% to 90% of said ore in the presence of carbon with chlorine in a conventional fluid bed chlorinator and under conventional fluid chlorination conditions at a temperature of from 800° C. to 1100° C. to yield a primary gaseous stream of product $TiCl_4$, carbon oxides, and ferrous chloride;
(b) cooling the primary gaseous stream from (a) above to a temperature below 675° C. sufficient to separate ferrous chloride as a solid from the product $TiCl_4$-containing gaseous stream while maintaining the $TiCl_4$ in the vapor state;
(c) converting solid ferrous chloride from (b) above by partial oxidation with molecular oxygen at a temperature of 325° C. to 675° C. to $Fe_2O_3$ and ferric chloride vapor;
(d) separating said ferric chloride vapor from said $Fe_2O_3$;
(e) nonselectively chlorinating the remaining 10% to 40% of the ore at 900° to 1400° C., in the presence of ferric chloride derived at least in part from step (c) above under entrained flow chlorination conditions to yield a secondary gaseous stream of product $TiCl_4$, carbon oxides and ferrous chloride;
(f) cooling the secondary gaseous stream from (e) above to a temperature below 675° C. sufficient to separate ferrous chloride from said $TiCl_4$-containing secondary gaseous stream while maintaining the $TiCl_4$ in the vapor state;
(g) returning said solid ferrous chloride derived from step (f) to said partial oxidation step (c) for conversion to ferric chloride; and
(h) combining the product $TiCl_4$ from said primary and secondary gaseous streams.

6. A process as defined in claim 5 wherein said molecular oxygen is a component of air.

7. A process as defined in claim 5 wherein solid iron chloride is isolated from the primary and secondary gaseous $TiCl_4$-containing product streams by quenching the streams with liquid $TiCl_4$, respectively, to a temperature sufficient to precipitate the iron chloride.

8. A process for making $TiCl_4$ from an iron-containing titaniferous ore comprising:
(a) nonselectively chlorinating 60% to 90% of said ore in the presence of carbon with chlorine in a conventional fluid bed chlorinator and under conventional fluid chlorination conditions at a temperature of from 800° C. to 1100° C. to yield a primary gaseous stream of product $TiCl_4$, carbon oxides and ferric chloride;
(b) cooling the primary gaseous stream from (a) above to a temperature below 325° C. sufficient to separate ferric chloride as a solid from the product $TiCl_4$-containing primary gaseous stream while maintaining the $TiCl_4$ in the vapor state;
(c) nonselectively chlorinating the remaining 10% to 40% of the ore at 900° to 1400° C., in the presence of carbon with ferric chloride from step (b) above and step (g) below under entrained flow chlorination conditions to yield a secondary gaseous stream of product $TiCl_4$, carbon oxides and ferrous chloride;
(d) cooling the secondary gaseous stream from (c) above to a temperature below 675° C. sufficient to separate ferrous chloride from said $TiCl_4$-containing secondary gaseous stream while maintaining the $TiCl_4$ in the vapor state;
(e) converting solid ferrous chloride from step (d) above with molecular oxygen to $Fe_2O_3$ and ferric chloride vapor;
(f) separating the ferric chloride vapor from the $Fe_2O_3$;
(g) returning the ferric chloride vapor from step (f) to step (c) above; and
(h) combining the product $TiCl_4$ from the primary and secondary gaseous streams.

9. A process as defined in claim 8 wherein said molecular oxygen is a component of air.

10. A process as defined in claim 8 wherein solid iron chloride is isolated from the primary and secondary gaseous $TiCl_4$-containing product streams by quenching the streams with liquid $TiCl_4$, respectively, to a temperature sufficient to precipitate the iron chloride.

11. A process for making $TiCl_4$ from an iron-containing titaniferous ore comprising:
(a) nonselectively chlorinating 60% to 90% of said ore in the presence of carbon with chlorine in a conventional fluid bed chlorinator and under conventional fluid chlorination conditions at a temperature of from 800° C. to 1100° C. to yield a primary gaseous stream of product $TiCl_4$, carbon oxides, and a mixture of ferrous and ferric chlorides;
(b) cooling the primary gaseous stream from (a) above to a temperature below 325° C. sufficient to separate ferric chloride and ferrous chloride as a solid from the $TiCl_4$-containing primary gaseous stream while maintaining the $TiCl_4$ in the vapor state;
(c) nonselectively chlorinating the remaining 10% to 40% of the ore at 900° to 1400° C. in the presence of carbon with ferric chloride under entrained flow chlorination conditions to yield a secondary gaseous stream of product $TiCl_4$, carbon oxides and ferrous chloride;

(d) cooling the secondary gaseous stream from (c) above to a temperature below 675° C. sufficient to separate ferrous chloride as a solid from the product TiCl$_4$-containing secondary gaseous stream while maintaining the TiCl$_4$ in the vapor state;

(e) combining said solid ferrous chloride and ferric chloride from step (b) with solid ferrous chloride from step (d);

(f) converting the solid ferrous chloride from step (e) by partial oxidation with molecular oxygen at a temperature of 325° C. to 675° C. to Fe$_2$O$_3$ and FeCl$_3$ vapor and vaporizing the solid FeCl$_3$ from step (b) above;

(g) separating the FeCl$_3$ vapor from said Fe$_2$O$_3$;

(h) returning the FeCl$_3$ vapor from step (g) to step (c); and (i) combining the product TiCl$_4$ from the primary and secondary gaseous streams.

12. A process as defined in claim 11 wherein said molecular oxygen is a component of air.

13. A process as defined in claim 11 wherein solid iron chloride is isolated from the primary and secondary gaseous TiCl$_4$-containing product streams by quenching the streams with liquid TiCl$_4$, respectively, to a temperature sufficient to precipitate the iron chloride.

* * * * *